United States Patent [19]

Wells et al.

[11] Patent Number: 5,264,840
[45] Date of Patent: Nov. 23, 1993

[54] METHOD AND APPARATUS FOR VECTOR ALIGNED DITHERING

[75] Inventors: Stuart C. Wells, Santa Clara; Grant J. Williamson, Sunnyvale, both of Calif.

[73] Assignee: Sun Microsystems, Inc., Mountain View, Calif.

[21] Appl. No.: 909,125

[22] Filed: Jul. 6, 1992

Related U.S. Application Data

[63] Continuation of Ser. No. 413,984, Sep. 28, 1989, abandoned.

[51] Int. Cl.⁵ .............................................. G09G 5/10
[52] U.S. Cl. ...................................... 345/147; 358/457
[58] Field of Search ................ 340/701, 703, 723, 724, 340/728, 739, 747, 767, 793; 358/160, 168, 169, 240, 455, 456, 457, 458, 459

[56] References Cited

U.S. PATENT DOCUMENTS

| | | | |
|---|---|---|---|
| 3,937,878 | 2/1976 | Judice | 340/767 |
| 4,586,037 | 4/1986 | Rosener et al. | 340/728 |
| 4,612,540 | 9/1986 | Pratt | 340/728 |

OTHER PUBLICATIONS

Shenk, Al; "Calculus and Analytic Geometry"; Goodyear Publishing Company, Inc.; copyright 1977; p. 409.

*Primary Examiner*—Richard Hjerpe
*Attorney, Agent, or Firm*—Blakely Sokloloff Taylor and Zafman

[57] ABSTRACT

A method and apparatus for dithering vectors in which the dither matrix is aligned to the vector and not to the display coordinate space. The dither matrix is aligned to the vector according to the major axis of the vector. In a preferred embodiment the dither matrix is rectangular in shape to correspond to the shape of the vector. The vector aligned dither matrix ensures that the individual pixels which make up the vector are dithered with elements more likely to simulate the original intermediate intensities.

42 Claims, 15 Drawing Sheets

| 0 | 8 | 4 | 10 | 2 | 12 | 6 | 14 | 1 | 9 | 5 | 11 | 3 | 13 | 7 | 15 |

Figure 4b

| X | Y | INDEX | | D(INDEX) | Gin | BASEin | BASEout | Gout | Gdisplay | |
|---|---|---|---|---|---|---|---|---|---|---|
|   |   | X | Y |   |   |   |   |   | Base 10 | Base 16 |
| 5 | 25 | 0 | 0 | 0 | 0 | 0 | 0 | 0 | 0 | 00 |
| 6 | 24 | 1 | 8 | 13 | 0 | 0 | 0 | 1 | 17 | 11 |
| 7 | 24 | 2 | 4 | 26 | 17 | 1 | 1 | 2 | 34 | 22 |
| 8 | 23 | 3 | 10 | 38 | 34 | 2 | 2 | 2 | 34 | 22 |
| 9 | 23 | 4 | 2 | 51 | 51 | 3 | 3 | 3 | 51 | 33 |
| 10 | 22 | 5 | 12 | 64 | 51 | 3 | 3 | 3 | 51 | 33 |
| 11 | 22 | 6 | 6 | 77 | 68 | 4 | 4 | 5 | 85 | 55 |
| 12 | 21 | 7 | 14 | 89 | 85 | 5 | 5 | 5 | 85 | 55 |
| 13 | 21 | 8 | 1 | 102 | 102 | 6 | 6 | 6 | 102 | 66 |
| 14 | 20 | 9 | 9 | 115 | 102 | 6 | 6 | 7 | 119 | 77 |
| 15 | 20 | 10 | 5 | 128 | 119 | 7 | 7 | 8 | 136 | 88 |
| 16 | 19 | 11 | 11 | 140 | 136 | 8 | 8 | 8 | 136 | 88 |
| 17 | 19 | 12 | 3 | 153 | 153 | 9 | 9 | 9 | 153 | 99 |
| 18 | 18 | 13 | 13 | 166 | 153 | 9 | 9 | 9 | 153 | 99 |
| 19 | 18 | 14 | 7 | 179 | 170 | 10 | 10 | 11 | 187 | bb |
| 20 | 17 | 15 | 15 | 191 | 187 | 11 | 11 | 11 | 187 | bb |
| 21 | 17 | 0 | 0 | 204 | 204 | 12 | 12 | 12 | 204 | cc |
| 22 | 16 | 1 | 8 | 217 | 204 | 12 | 12 | 13 | 221 | dd |
| 23 | 16 | 2 | 4 | 230 | 221 | 13 | 13 | 14 | 238 | ee |
| 24 | 15 | 3 | 10 | 242 | 238 | 14 | 14 | 14 | 238 | ee |
| 25 | 15 | 4 | 2 | 255 | 255 | 15 | 15 | 15 | 255 | ff |

Figure 4c

| 15 | 11 | 13 | 10 | 5 | 9 | 3 | 0 | 14 | 10 | 12 | 2 | 6 | 8 | 4 | 7 |
|----|----|----|----|---|---|---|---|----|----|----|---|---|---|---|---|
| 0 | 8 | 4 | 10 | 2 | 12 | 6 | 14 | 1 | 9 | 5 | 11 | 3 | 13 | 7 | 15 |
| 7 | 3 | 5 | 11 | 15 | 1 | 13 | 9 | 8 | 4 | 6 | 10 | 14 | 2 | 12 | 0 |

Figure 5b

| X | Y | INDEX | | D(INDEX) | Gin | BASEin | BASEout | Gout | Gdisplay | |
|---|---|---|---|---|---|---|---|---|---|---|
| | | X | Y | | | | | | Base 10 | Base 16 |
| 4 | 27 | 0 | 0 | 15 | 0 | 0 | 0 | 0 | 0 | 00 |
| 4 | 26 | 0 | 1 | 0 | 0 | 0 | 0 | 0 | 0 | 00 |
| 4 | 25 | 0 | 2 | 7 | 0 | 0 | 0 | 0 | 0 | 00 |
| 5 | 26 | 1 | 0 | 11 | 0 | 0 | 0 | 0 | 0 | 00 |
| 5 | 25 | 1 | 1 | 8 | 0 | 0 | 0 | 0 | 0 | 00 |
| 5 | 24 | 1 | 2 | 3 | 0 | 0 | 0 | 0 | 0 | 00 |
| 6 | 25 | 2 | 0 | 13 | 5 | 0 | 0 | 0 | 0 | 00 |
| 6 | 24 | 2 | 1 | 4 | 5 | 0 | 0 | 1 | 17 | 11 |
| 6 | 23 | 2 | 2 | 5 | 0 | 0 | 0 | 0 | 0 | 00 |
| 7 | 25 | 3 | 0 | 1 | 3 | 0 | 0 | 1 | 17 | 11 |
| 7 | 24 | 3 | 1 | 10 | 14 | 0 | 0 | 1 | 17 | 11 |
| 7 | 23 | 3 | 2 | 11 | 3 | 0 | 0 | 0 | 0 | 00 |
| 8 | 24 | 4 | 0 | 5 | 15 | 0 | 0 | 1 | 17 | 11 |
| 8 | 23 | 4 | 1 | 2 | 15 | 0 | 0 | 1 | 17 | 11 |
| 8 | 22 | 4 | 2 | 15 | 0 | 0 | 0 | 0 | 0 | 00 |
| 9 | 24 | 5 | 0 | 9 | 7 | 0 | 0 | 0 | 0 | 00 |
| 9 | 23 | 5 | 1 | 12 | 28 | 17 | 1 | 1 | 17 | 11 |
| 9 | 22 | 5 | 2 | 1 | 7 | 0 | 0 | 1 | 17 | 11 |
| 10 | 23 | 6 | 0 | 3 | 25 | 17 | 1 | 2 | 34 | 22 |
| 10 | 22 | 6 | 1 | 6 | 25 | 17 | 1 | 2 | 34 | 22 |
| 10 | 21 | 6 | 2 | 13 | 0 | 0 | 0 | 0 | 0 | 00 |
| 11 | 23 | 7 | 0 | 0 | 10 | 0 | 0 | 1 | 17 | 11 |
| 11 | 22 | 7 | 1 | 14 | 42 | 34 | 2 | 2 | 34 | 22 |
| 11 | 21 | 7 | 2 | 9 | 10 | 0 | 0 | 0 | 0 | 00 |
| 12 | 22 | 8 | 0 | 14 | 35 | 34 | 2 | 2 | 34 | 22 |
| 12 | 21 | 8 | 1 | 1 | 35 | 34 | 2 | 2 | 34 | 22 |
| 12 | 20 | 8 | 2 | 8 | 1 | 0 | 0 | 0 | 0 | 00 |
| 13 | 22 | 9 | 0 | 10 | 13 | 0 | 0 | 1 | 17 | 11 |
| 13 | 21 | 9 | 1 | 9 | 56 | 51 | 3 | 3 | 51 | 33 |
| 13 | 20 | 9 | 2 | 4 | 13 | 0 | 0 | 1 | 17 | 11 |
| 14 | 21 | 10 | 0 | 12 | 45 | 34 | 2 | 2 | 34 | 22 |
| 14 | 20 | 10 | 1 | 5 | 45 | 34 | 2 | 3 | 51 | 33 |
| 14 | 19 | 10 | 2 | 6 | 1 | 0 | 0 | 0 | 0 | 00 |

Figure 5c1

| X | Y | INDEX | | D(INDEX) | Gin | BASEin | BASEout | Gout | Gdisplay | |
|---|---|---|---|---|---|---|---|---|---|---|
| | | X | Y | | | | | | Base 10 | Base 16 |
| 15 | 21 | 11 | 0 | 2  | 16  | 0   | 0 | 1  | 17  | 11 |
| 15 | 20 | 11 | 1 | 11 | 70  | 68  | 4 | 4  | 68  | 44 |
| 15 | 19 | 11 | 2 | 10 | 16  | 0   | 0 | 1  | 17  | 11 |
| 16 | 20 | 12 | 0 | 6  | 55  | 51  | 3 | 3  | 51  | 33 |
| 16 | 19 | 12 | 1 | 3  | 55  | 51  | 3 | 4  | 68  | 44 |
| 16 | 18 | 12 | 2 | 14 | 1   | 0   | 0 | 0  | 0   | 00 |
| 17 | 20 | 13 | 0 | 8  | 20  | 17  | 1 | 1  | 17  | 11 |
| 17 | 19 | 13 | 1 | 13 | 84  | 68  | 4 | 5  | 85  | 55 |
| 17 | 18 | 13 | 2 | 2  | 20  | 17  | 1 | 2  | 34  | 22 |
| 18 | 19 | 14 | 0 | 4  | 66  | 51  | 3 | 4  | 68  | 44 |
| 18 | 18 | 14 | 1 | 7  | 66  | 51  | 3 | 4  | 68  | 44 |
| 18 | 17 | 14 | 2 | 12 | 1   | 0   | 0 | 0  | 0   | 00 |
| 19 | 19 | 15 | 0 | 7  | 23  | 17  | 1 | 1  | 17  | 11 |
| 19 | 18 | 15 | 1 | 15 | 98  | 85  | 5 | 5  | 85  | 55 |
| 19 | 17 | 15 | 2 | 0  | 23  | 17  | 1 | 2  | 34  | 22 |
| 20 | 18 | 0  | 0 | 15 | 75  | 68  | 4 | 4  | 68  | 44 |
| 20 | 17 | 0  | 1 | 0  | 75  | 68  | 4 | 5  | 85  | 55 |
| 20 | 16 | 0  | 2 | 7  | 1   | 0   | 0 | 0  | 0   | 00 |
| 21 | 18 | 1  | 0 | 11 | 26  | 17  | 1 | 1  | 17  | 11 |
| 21 | 17 | 1  | 1 | 8  | 112 | 102 | 6 | 7  | 119 | 77 |
| 21 | 16 | 1  | 2 | 3  | 26  | 17  | 1 | 2  | 34  | 22 |
| 22 | 17 | 2  | 0 | 13 | 86  | 85  | 5 | 5  | 85  | 55 |
| 22 | 16 | 2  | 1 | 4  | 86  | 85  | 5 | 5  | 85  | 55 |
| 22 | 15 | 2  | 2 | 5  | 2   | 0   | 0 | 0  | 0   | 00 |
| 23 | 17 | 3  | 0 | 1  | 30  | 17  | 1 | 2  | 34  | 22 |
| 23 | 16 | 3  | 1 | 10 | 127 | 119 | 7 | 7  | 119 | 77 |
| 23 | 15 | 3  | 2 | 11 | 30  | 17  | 1 | -2 | 34  | 22 |
| 24 | 16 | 4  | 0 | 5  | 96  | 85  | 5 | 6  | 102 | 66 |
| 24 | 15 | 4  | 1 | 2  | 96  | 85  | 5 | 6  | 102 | 66 |
| 24 | 14 | 4  | 2 | 15 | 2   | 0   | 0 | 0  | 0   | 00 |
| 25 | 16 | 5  | 0 | 9  | 16  | 0   | 0 | 1  | 17  | 11 |
| 25 | 15 | 5  | 1 | 12 | 70  | 68  | 4 | 4  | 68  | 44 |
| 25 | 14 | 5  | 2 | 1  | 16  | 0   | 0 | 1  | 17  | 11 |
| 26 | 15 | 6  | 0 | 3  | 0   | 0   | 0 | 0  | 0   | 00 |
| 26 | 14 | 6  | 1 | 6  | 0   | 0   | 0 | 0  | 0   | 00 |
| 26 | 13 | 6  | 2 | 13 | 0   | 0   | 0 | 0  | 0   | 00 |

Figure 5c2

$$\begin{bmatrix} 15 & 4 & 13 & 1 & 11 & 7 & 10 & 5 & 8 & 2 & 14 & 0 & 12 & 3 & 9 & 6 \\ 0 & 12 & 3 & 9 & 6 & 15 & 4 & 13 & 1 & 11 & 7 & 10 & 5 & 8 & 2 & 14 \\ 10 & 5 & 8 & 2 & 14 & 0 & 12 & 3 & 9 & 6 & 15 & 4 & 13 & 1 & 11 & 7 \end{bmatrix}$$

Figure 6a

$$\begin{bmatrix} 0 & 8 & 4 & 10 & 2 & 12 & 6 & 14 & 1 & 9 & 5 & 11 & 3 & 13 & 7 & 15 \\ 1 & 9 & 5 & 11 & 3 & 13 & 7 & 15 & 0 & 8 & 4 & 10 & 2 & 12 & 6 & 14 \\ 15 & 7 & 13 & 3 & 11 & 5 & 9 & 1 & 14 & 6 & 12 & 2 & 10 & 4 & 8 & 0 \end{bmatrix}$$

Figure 6b

$$\begin{bmatrix} 15 & 11 & 13 & 1 & 5 & 9 & 3 & 0 & 14 & 10 & 12 & 2 & 6 & 8 & 4 & 7 \\ 0 & 8 & 4 & 10 & 2 & 12 & 6 & 14 & 1 & 9 & 5 & 11 & 3 & 13 & 7 & 15 \\ 7 & 3 & 5 & 11 & 15 & 1 & 13 & 9 & 8 & 4 & 6 & 10 & 14 & 2 & 12 & 0 \end{bmatrix}$$

Figure 6c

$$\begin{bmatrix} 12 & 3 & 12 & 3 & 12 & 3 & 12 & 3 & 12 & 3 & 12 & 3 & 12 & 3 & 12 & 3 \\ 0 & 9 & 0 & 9 & 0 & 9 & 0 & 9 & 0 & 9 & 0 & 9 & 0 & 9 & 0 & 9 \\ 15 & 6 & 15 & 6 & 15 & 6 & 15 & 6 & 15 & 6 & 15 & 6 & 15 & 6 & 15 & 6 \end{bmatrix}$$

Figure 6d

METHOD AND APPARATUS FOR VECTOR ALIGNED DITHERING

This is a continuation of application Ser. No. 07/413,984 filed Sep. 28, 1989, now abandoned.

BACKGROUND OF THE INVENTION

1. Field of the Invention:

The method and apparatus of the present invention relates to dithering techniques used to represent digital images. More particularly, the method and apparatus of the present invention relates to rendering dithered vectors.

2. Related Applications

The present invention is related to U.S. patent application Ser. No. 07/413,991, filed Sep. 28, 1989 entitled "Method and Apparatus For Non-Linear Dithering of Graphic Images, U.S. patent application Ser. No. 07/413,977, filed Sep. 28, 1989 entitled "Method and Apparatus For The Dithering of Antialiased Vectors" and U.S. patent application, Ser. No. 07/413,983, filed Sep. 28, 1989 entitled "Method and Apparatus for Dithering Graphic Images" and are herein incorporated by reference.

3. Art Background:

A picture or image may be thought of as a continuous representation of the object projected. It is often desirable to represent images on a digital computer display device such as a monitor or a printer. However, a computer and its output devices are binary in nature. A computer display comprises a grid of display elements, referred to as pixels, which can either be in one of a plurality of on states indicative of its intensity, in which the pixel location is illuminated, or in the off state in which the pixel location is not illuminated. In order to display continuous images, the continuous images must be converted to discrete representations corresponding to the pixel locations on the display device. A digital image is quantized in both the spatial domain and the intensity domain.

The amount of memory available dictates the quantized levels available to represent the image. If the resolution of either sample space (i.e. spatial and intensity) drops below a threshold (due to memory limitations), the eye will detect the discrete boundaries between samples. In the intensity domain, insufficient resolution is marked by the presence of artificial edges delimiting the transitions between regions of incremental intensity. Other undesirable visible effects, such as patterning, color shifting and biasing, are introduced due to the visible thresholding between quantized intensity levels.

To minimize the undesirable effects, a technique, referred to as dithering or digital halftoning, is used. Dithering is a technique which permits the simulation of intensity levels between quantized levels by permitting the eye to integrate fine detail within an area and record only the overall intensity of the area. Dithering aims to sacrifice some of an image's spatial resolution for an increase in perceived intensity resolution, accomplished by averaging the intensities of several neighboring pixels to simulate intensities that lie between quantization levels. Typically, this technique works well, since the eye naturally blends individual pixel values such that only the average intensity in the surrounding area or neighborhood is perceived. For more information on dithering, see Ulichney, *Digital Halftoning* (1987, MIT Press); Foley & Van Dam, *Fundamentals of Interactive Computer Graphics*, p. 597–602 (Addison-Wesley, 1984).

Several types of dithering techniques exist. The types of dithering algorithms are distinguished by the way the neighborhoods are chosen. In the technique of ordered dither, the neighborhoods are chosen according to a two dimensional set of values, referred to as the dither table or dither matrix, which is tiled into the image's coordinate space. Typically for area dither, the table has the same number of row and column elements and the total number of entries in the table equals the number of simulatable intensity levels between the quantized levels. The values contained in the table are used to make decisions about which quantized intensity value will be output at each position, that is, should the intensity value be quantized to the quantized value above or below the original intensity value. Typically, the dither table values are different at each x,y coordinate location such that when a constant input intensity is dithered over some area, the output values will alternate in some pattern between the upper and lower quantized intensity levels.

The ordered dither process is explained in reference to FIG. 1a. Process 1.0 determines the appropriate index into the dither matrix based on the x-y coordinates of the current pixel. Conceptually, the idea is to "tile" the dither matrix into the image coordinate space, thereby replicating each entry once every n pixels, where n is the dimension of the dither table. The indices to the matrix, i-j, are determined according to the following equations:

$$i = x \bmod n$$

$$j = y \bmod n$$

If n is a power of two, it is possible to utilize the least significant bits of the x-y screen coordinates for indexing the dither matrix. For example, if the dimension of the dither matrix is $4 \times 4$, then the 2 least significant bits of the x-y coordinates will provide the required modulo-4 indexing.

At process 2.0, the dither values are retrieved from the matrix according to i-j dither indices determined. By the nature of the problem, the output intensity scale has fewer entries than the input intensity scale. In order to quantize the input value, there must be a predetermined correspondence between each level on the output scale to a value on the input scale. It is the task of process 3.0 to determine the input-scale base value which is the value from the input scale which is nearest to but not greater than the original input intensity or and which directly corresponds to a value in the stored range of intensities.

The next process, 4.0, determines the value in the stored range of quantized intensity levels that corresponds to the input - scale base. This value will be referred to as the "stored range base value".

At process 5.0, the difference between the input intensity value and its input-scale base value is determined. The resoft, always guaranteed to be greater than or equal to zero, is the delta value passed along to process 6.0. Process 6.0 is the pivotal dither process, comparing the delta value to the dither value and outpuffing either the stored range base value or the next higher value. Specifically, if the delta value is less than or equal to the dither value, the stored range base value is output; if delta is greater than the dither value, then the stored range base plus one is output. The output from process 6.0 is the quantized pixel value that is deposited into the pixel store (e.g. a frame buffer).

Although quantized values are stored, these values are typically mapped back to an intensity scale with a greater intensity range for display viewing. That is the task of process 7.0, which is usually implemented by lookup-tables lying between the frame buffer output and the video display input. (This is not part of dithering per se, but is utilized for reconstruction of the dithered image for viewing.)

By performing processes 1.0 through 6.0 on successive input values, dithering causes values both greater than and less than the input intensity to ultimately be displayed, producing regions over which the overall average intensity is approximately equal to the original input intensity.

The dithering process is applied to all portions of the digital image. Although dithering works well when operating on areas of pixels, dithering does not work well with vectors because the area of a vector is small and dithering relies on the integration of several pixels over a sizeable area in order to convey the desired intermediate intensity. Further, when a square dither matrix is aligned with the screen, the dispersion of dither values varies with the angle of the vector with respect to the screen. This latter property of a screen aligned dither matrix is not desirable and the dither process should be vector angle independent.

This is best illustrated by FIG. 1b which shows two dithered vectors of single pixel width (Vector 1 and Vector 2). Review of the intensity values of the vector 1 particularly points out the problem. The vector consists of high dither values and not an alternating pattern of low dither/high dither values which is desirable to represent intermediate intensity values. A desirable configuration of intensity values is illustrated in FIG. 1c.

SUMMARY OF THE INVENTION

It is therefor an object of the present invention to provide a method and apparatus to dither vectors.

In the method and apparatus of the present invention, a vector is dithered by aligning the dither matrix with the vector itself as opposed to the screen coordinate space. The dither matrix is aligned according to the angle of the vector. More particularly, the coordinate of the major axis of the vector is used to generate the index along the longest dimension of the rectangular dither matrix. Preferably, the dither matrix is rectangular in shape such that the dithering elements are arranged to correspond to the shape of the vector. The vector aligned dither matrix ensures that the individual pixels which make up the vector are dithered with elements which more closely simulate the original intermediate intensities between quantized levels.

NOTATION AND NOMENCLATURE

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a selfconsistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be born#,, in -hind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

BRIEF DESCRIPTION OF THE DRAWINGS

The objects, features and advantages of the method and apparatus of the present invention will be apparent from the following detailed description of the invention in which:

FIGS. 4a, 4b, 4c and 4d illustrate a preferred embodiment for a monochrome vector of single pixel width.

FIGS. 5a, 5b, 5c1, 5c2 and 5d illustrate a preferred embodiment for an anti-aliased monochrome vector having a width of three pixels FIGS. 6a, 6b, 6c and 6d depict illustrative dither matrices that may be employed with the process of the present invention to dither an antialiased vector three pixels in width.

DETAILED DESCRIPTION OF THE INVENTION

General System Configuration

Figure 2:
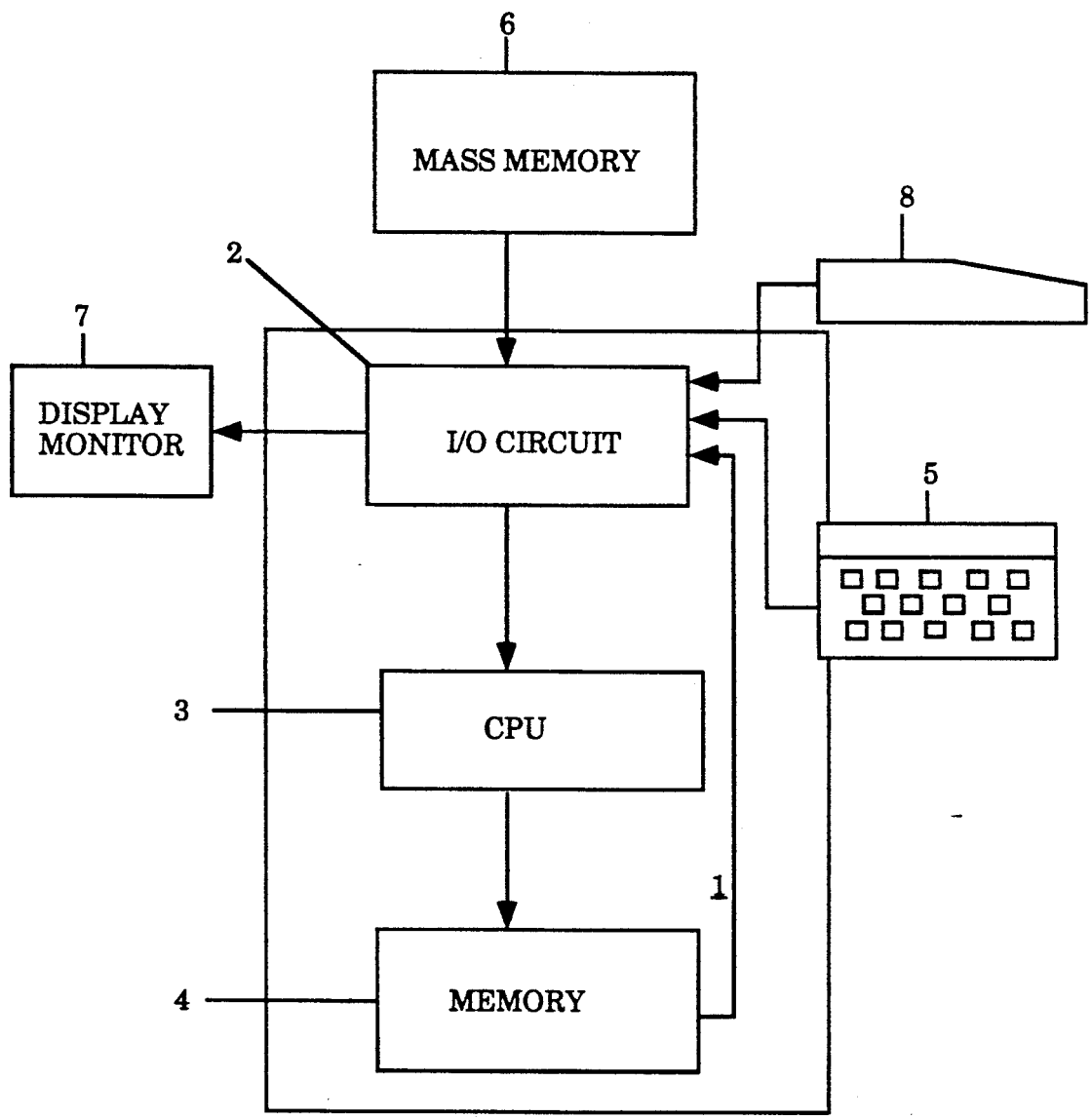
FIG. 2 depicts an illustrative computer system employed in the system of the present invention.

FIG. 2 shows a typical computer-based system for the dithering of digital images according to the present invention. Shown there is a computer 1 which comprises three major components. The first of these is the input/output (I/O) circuit 2 which is used to communicate information in appropriately structured form to and from the other parts of the computer 1. Also shown as a part of computer 1 is the central processing unit (CPU) 3 and memory 4. These latter two elements are those typically found in most general purpose computers and almost all special purpose computers. In fact, the several elements contained within computer 1 are intended to be representative of this broad category of data processors. Particular examples of suitable data processors to fill the role of computer 1 include machines manufactured by Sun Microsystems, Inc., Mountain View, Calif. Other computers having like capabilities may of course be adapted in a straightforward manner to perform the functions described below.

Also shown in FIG. 2 is an input device 5, shown in typical embodiment as a keyboard. It should be understood, however, that the input device may actually be a card reader, magnetic or paper tape reader, or other well-known input device (including, of course, another computer). A mass memory device 6 is coupled to the I/O circuit 2 and provides additional storage capability for the computer 1. The mass memory may include other programs and the like and may take the form of a magnetic or paper tape reader or other well known device. It will be appreciated that the data retained within mass memory 6, may, in appropriate cases, be incorporated in standard fashion into computer 1 as part of memory 4.

In addition, a display monitor 7 is illustrated which is used to display messages or other communications to the user. Such a display monitor may take the form of any of several well-known varieties of CRT displays. Preferably, the display monitor 7 displays the graphic images generated according to the process of the present invention. A cursor control 8 is used to select command modes and provides a more convenient means to input information into the system.

Process Description

In the process of the present invention, the dither matrix is aligned to the vector to be dithered. This is achieved by selecting the dither elements from the matrix according the incremental values along the major axis.

The number of entries in the dither matrix generally determines the number of intermediate intensity levels that can be simulated between quantization levels. Although the dither matrix utilized is not limited to a certain shape or dimension so long as it comprises the number of intermediate intensity levels desired, it is preferred that it is rectangular in shape such that the dithering elements are arranged to best correspond to the shape of the vector. For example, if a vector represented by an 8 bit intensity level is dithered to 4 bits, it is preferred that, for a vector of single pixel width, the dither matrix is 1×16. If the same vector is anti-aliased to 3 pixels wide, it is preferred that the dither matrix would correspondingly be 3 pixels in width (3×16, for example).

The process of vector aligned dithering for a monochrome vector of single pixel width is illustrated in the flow chart of FIG. 3a, FIG. 3b and FIGS. 4a, 4b, 4c and 4d.

In the present illustration, the intensities of the original vector illustrated are represented by eight bits, providing a range of 256 intensities. Using the system of the present invention, the intensities of the vector are quantized to a 4 bit representation thereby providing a range of only 16 intensities which are arranged in a manner that the eye will integrate the quantized intensities along the vector to best represent the original unquantized (intermediate) intensities. Although the following description illustrates the dithering of 8 bits to 4 bits, the present invention is not limited as such and is generally applicable to quantization by any number of bits.

Figure 3A:
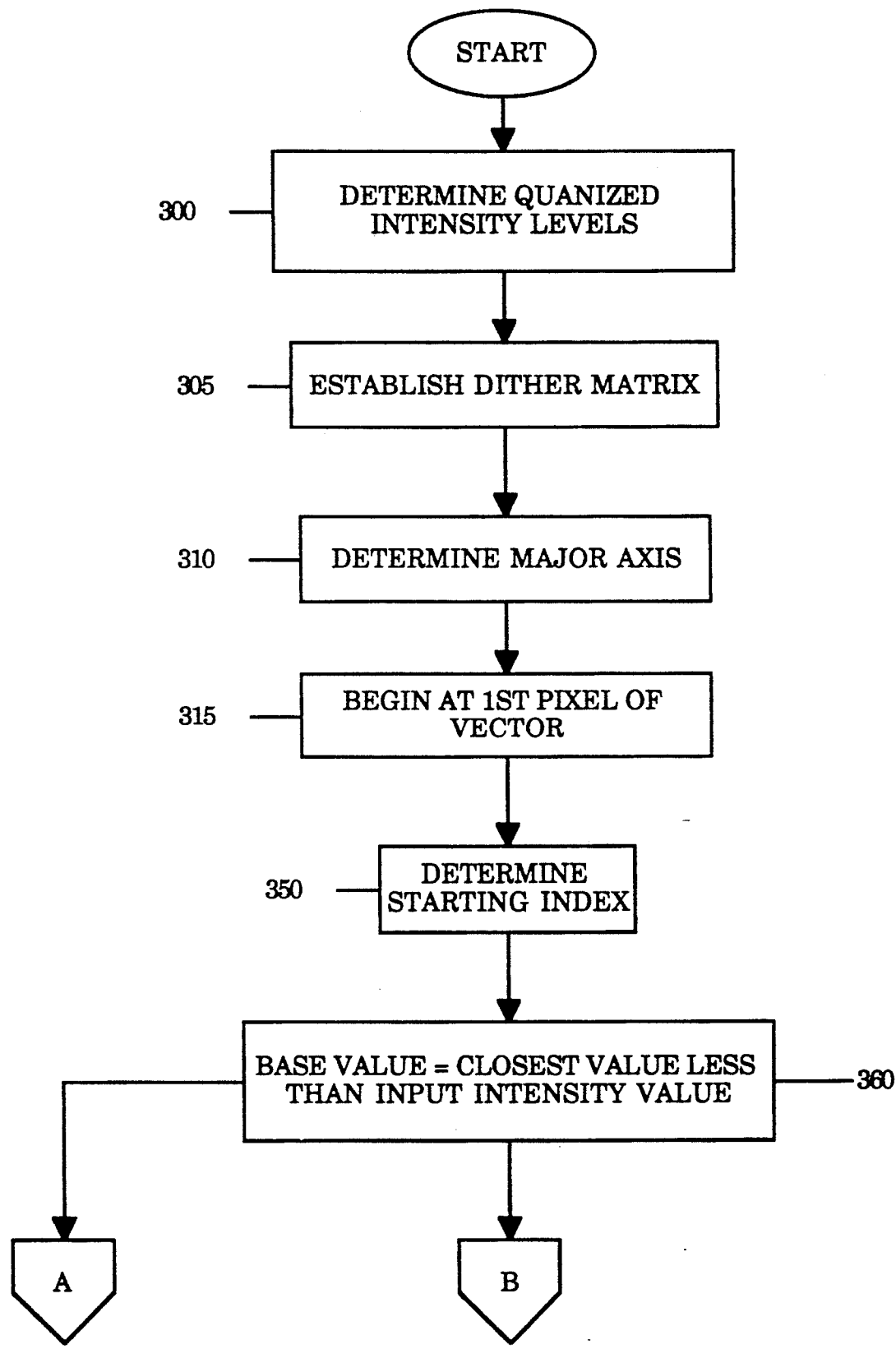
FIGS. 3a and 3b are flowcharts illustrating the process steps of a preferred embodiment of the present invention.
Figure 3B:
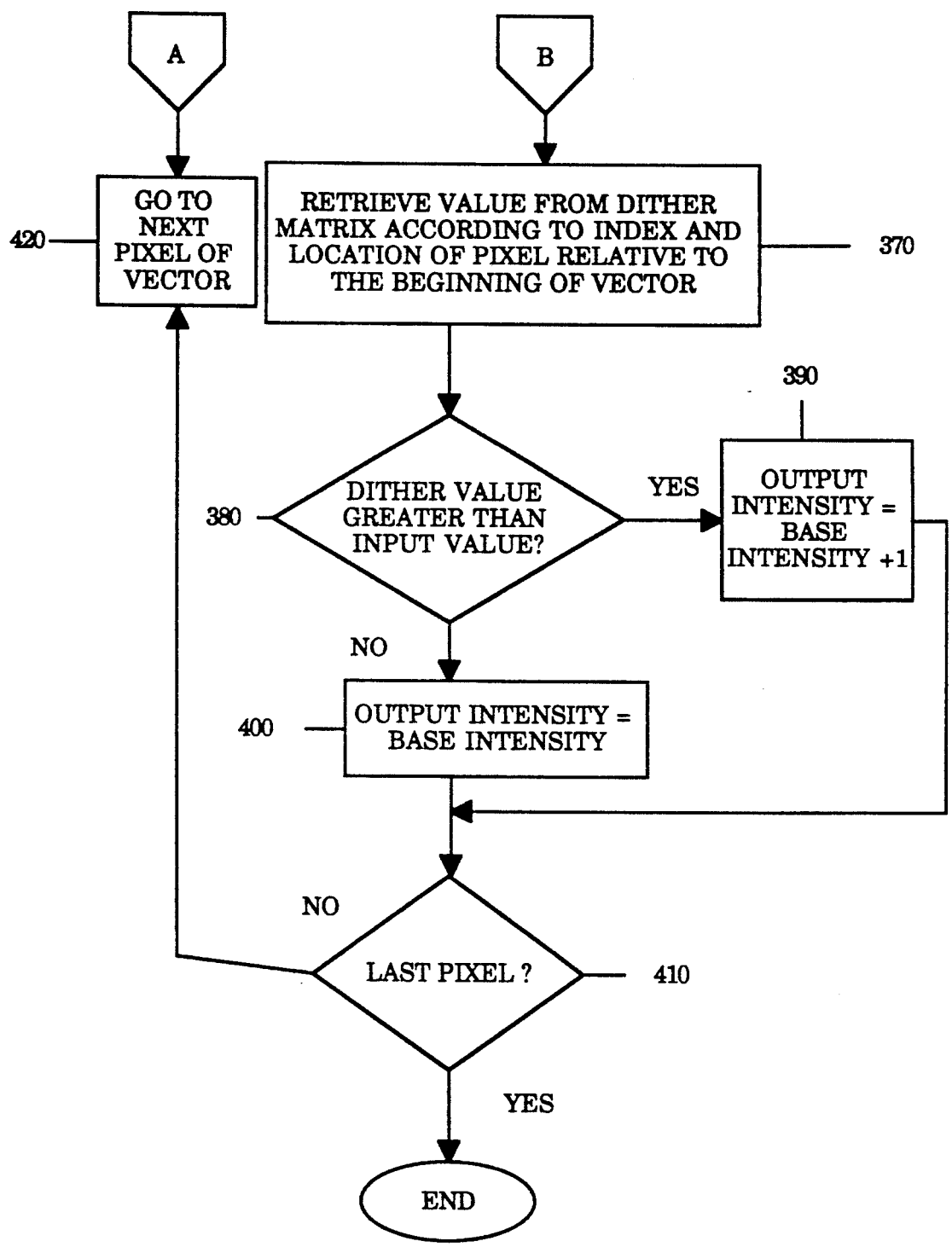

Referring to the flowchart of FIG. 3a and FIG. 3b at block 300, the quantized intensity levels are first determined. Typically the quantized levels are determined by evenly spacing the available number of intensity values across the range of original intensity values. This is referred to as linear quantization. In the present example, the number of original intensity values is 256 and the number of dithered intensity values is 16. Therefore the 16 quantized intensity values will be equal to the original intensity values at 0, 17, 34, 51, 68, 85, 102, 119, 136, 153, 170, 187, 204, 221, 238, 255.

In another embodiment, a non-linear quantization process is employed in which the quantized intensity levels are not evenly spaced apart, but are grouped closer together around the lower intensities to take into consideration the fact that the eye perceives more intensity variations at lower intensities. This process is described in co-pending U.S. patent application Ser. No. 07/413,991 entitled "Method and Apparatus for Non-Linear Dithering" of Graphic Images filed Sep. 28, 1989.

At block 305, the dither matrix is established to have as entries the values between the quantized intensity levels. Therefore, in the present example, the dither matrix contains values between and including 0 and 15.

The elements of the dither matrix are organized to provide the correct grouping of quantized levels such that the eye will integrate the quantized intensity levels and perceive the desired intermediate intensity levels that are no longer represented after quantization. To provide the desired perception, the dither matrix elements are organized in an attempt to maintain the local average intensity of the undithered line's intensity. One method of accomplishing this is to alternate dither matrix values at the high end of the range with dither matrix values at the low end of the range. For more information in the arrangement of dither matrix values, see Ulichney, *Digital Halftoning*, pp. 63-319 (1988 MIT Press).

For a monochrome vector of single pixel width, which is to be dithered from 8 bits to 4 bits, the dither matrix is preferably a 1×16 matrix as shown in FIG. 4. The dither matrix elements represent the number of intermediate intensity levels (16) between quantized levels and the elements are organized in a manner that the eye will integrate the resulting pattern of quantize values to perceive the desired intermediate intensity values.

At block 310, the major axis of the vector is determined. The major axis is defined to be the longer of the axes the vector is oriented in. In the present example the x axis is the major axis because the vector is longer in the x direction than in the y direction.

Figure 7A:
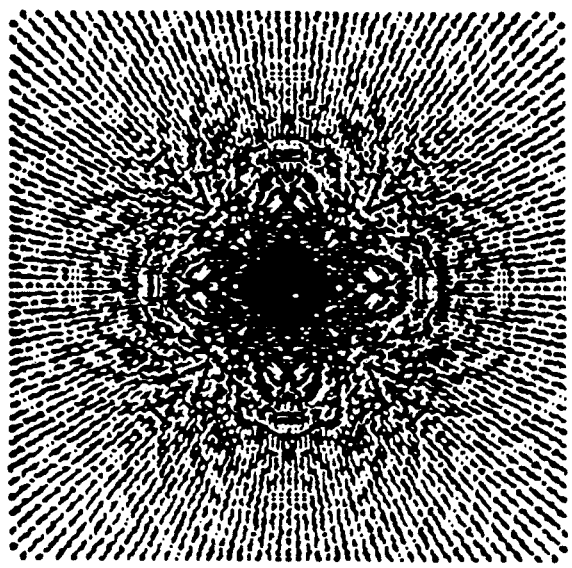
FIGS. 7a and 7b strafe the Moire effect of indexing to the same starting point into the dither matrix and the effect of varying the starting point into the dither matrix.
Figure 7B:
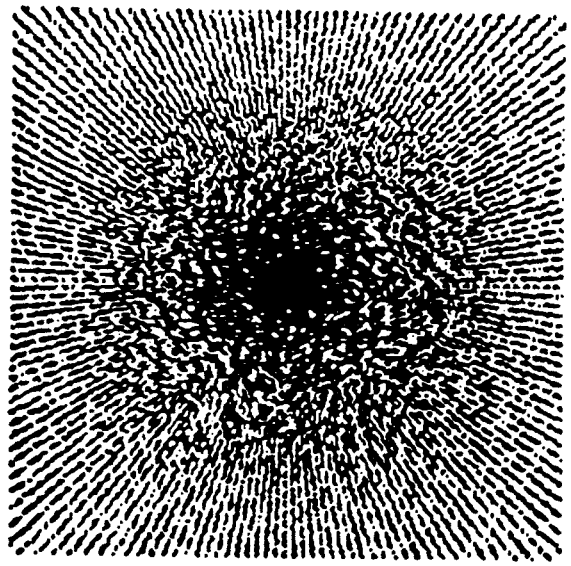

At block 350, the starting index to the dither matrix is determined once the starting index is determined, the dither elements are sequentially retrieved for each succeeding pixel along the vector to determine the dithered intensity value for each pixel. To align the dither matrix to the vector, the starting index is determined according to the major axis of the vector. The index may be determined simply by correlating the first element in the dither matrix with the first value along the major axis and each increment along the major axis with each subsequent element from the major axis. However, it has been found that it is not necessary to index into the dither matrix at a fixed starting location. Furthermore, it is preferable that the starting location of the index into the dither matrix is varied to randomize the dither error for over written anti-aliased vectors and to avoid "patterns" of pixels which are caused by the synchronization of dither patterns for vectors which are adjacent and approximately parallel. This is illustrated by FIGS. 7a and 7b. FIG. 7a shows the Moire effect resulting from the dithering of an image of radial lines originating from a central point wherein the starting point into the dither matrix is the same for each vector. FIG. 7b shows how the patterning can be decreased by randomizing the starting point into the dither matrix. To vary the starting location of the index into the matrix, an offset random variable may be introduced to determine the starting index. Alternatively, the starting point may be varied by setting the starting point to be the last matrix element indexed during the dithering of the previous vector.

At block 360, the base value is determined. The base value is the quantized value which maps to a value on the input intensity scale that is closest to, but not greater than, the input intensity level. Depending upon the following process, the output intensity level will either be the base value or the base value +1.

At block 370, a dither value is retrieved from the dither matrix according to the starting index previously calculated and the location of the pixel element in the vector relative to the beginning of the vector. For example, the dither value retrieved at the starting index computed is used to determine the dithered intensity value of the first pixel of the vector. Similarly, the dither value retrieved at the next location in the dither matrix is used to determine the output dithered intensity value for the second pixel along the major axis of the vector.

At block 380, the dither value is compared to the delta value that results from subtracting the input-scale base value from the input intensity value. If the difference between the input intensity value and its base is less than or equal to the dither value, at block 390, the output intensity is set to equal the base value. If the difference between the input intensity value and the base is greater than the dither value, at block 400, the output intensity is set to equal the next higher quantized intensity level. This process continues for each succeeding pixel until the last pixel in the vector has been processed.

Alternatively, to simplify hardware design it may be desirable to have the same range of values in the dither matrix regardless of the range of values between quantized intensity values. Preferably, in order to maintain the desired distribution of quantized intensity values, a mapping function is generated between the range of intensity values between quantized intensity values and the range of values in the dither matrix. The mapping function is applied to the delta value to adjust the delta value prior to comparison to the dither value. For further information, see copending U.S. patent application Ser. No. 07/413,983, entitled "Method and Apparatus for Dithering Graphic Images".

Figure 4A:
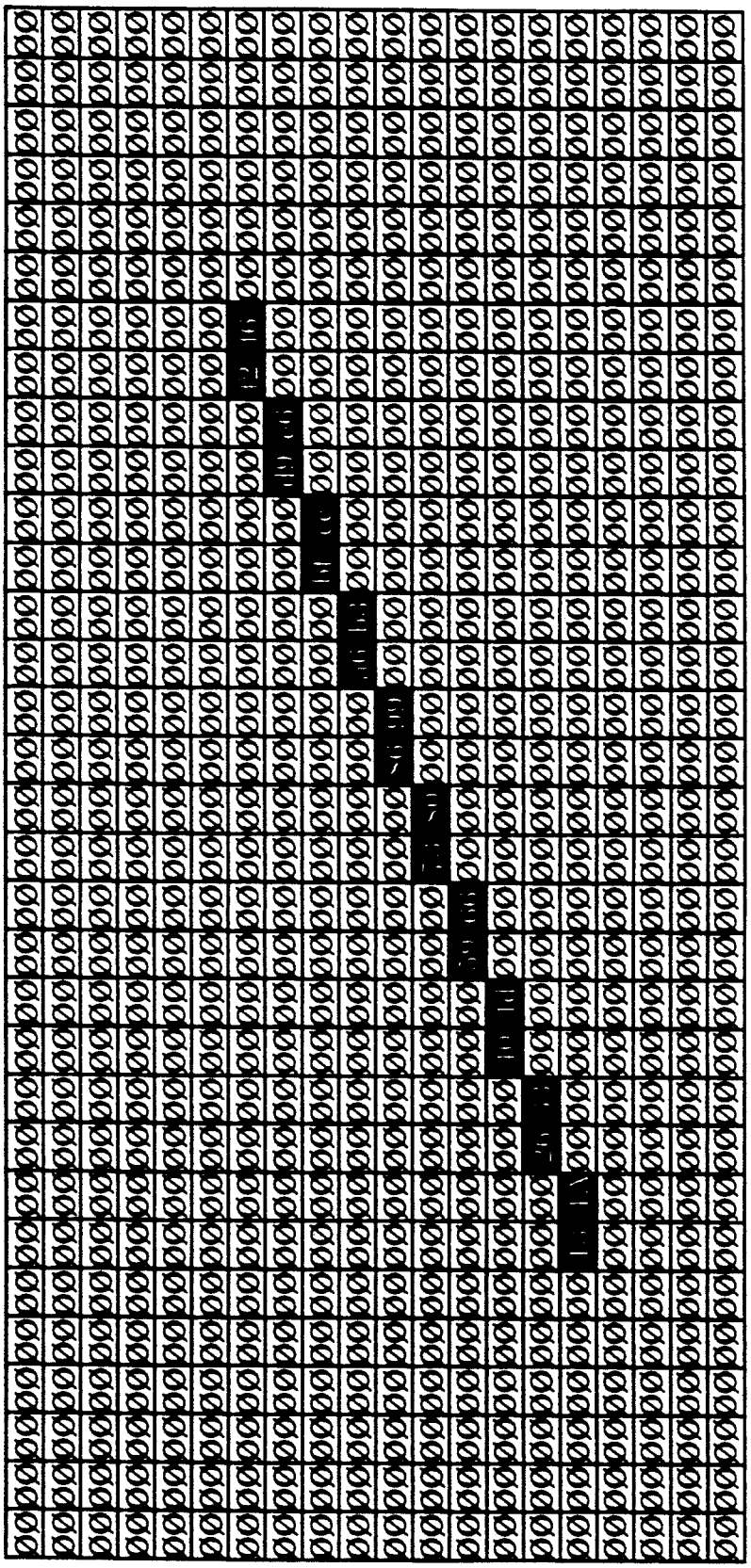

A numerical example is set forth in FIGS. 4a, 4b, 4c and 4d. FIG. 4a depicts the vector to be dithered and its corresponding intensity values (note that in the present example the intensity values are represented in hexadecimal format). The vector is drawn from (x,y) (5,25) to (25,15). The intensity values are interpolated along the span of the vector, beginning at 0 and ending at 255. It should be noted that the example illustrates only one color component. However, this example is generally applicable to RGB components because in dithering RGB data, each color component (i.e., R, G and B) is dithered identically but independently.

FIG. 4b shows the dithering matrix used in conjunction with linear quantization. FIG. 4c is a table which illustrates step by step the vector aligned dithering of the vector illustrated in FIG. 4a. Each row in the table corresponds to one rendered pixel of the vector. The columns "X" and "Y" respectively represent the X and Y coordinates of the pixel. The columns "INDEX" and "D(INDEX)" respectively represent the index (indices) into the dither matrix and the dither matrix value at the specified index. The column "Gin" represent the 8-bit gray level (0–255) of the current pixel. This is the value input to the dithering process. The column "BASEin" is the base value to which Gin is compared to determine which quantization range it falls into. The column "BASEout" represents the corresponding 4-bit base value for generating dithered output. Depending upon the dither comparison result, either BASEout or BASEout+1 will be output. The column "Gout" represents the 4-bit gray level (0–15) which results from dithering Gin. This value (either BASEout or BASEout+1) is placed in the frame buffer. The column "Gdisplay" represents the 8-bit gray level (0–255) which is actually observed, produced by mapping the 4-bit frame buffer value to 8 bits via an output lookup table.

Figure 4D:
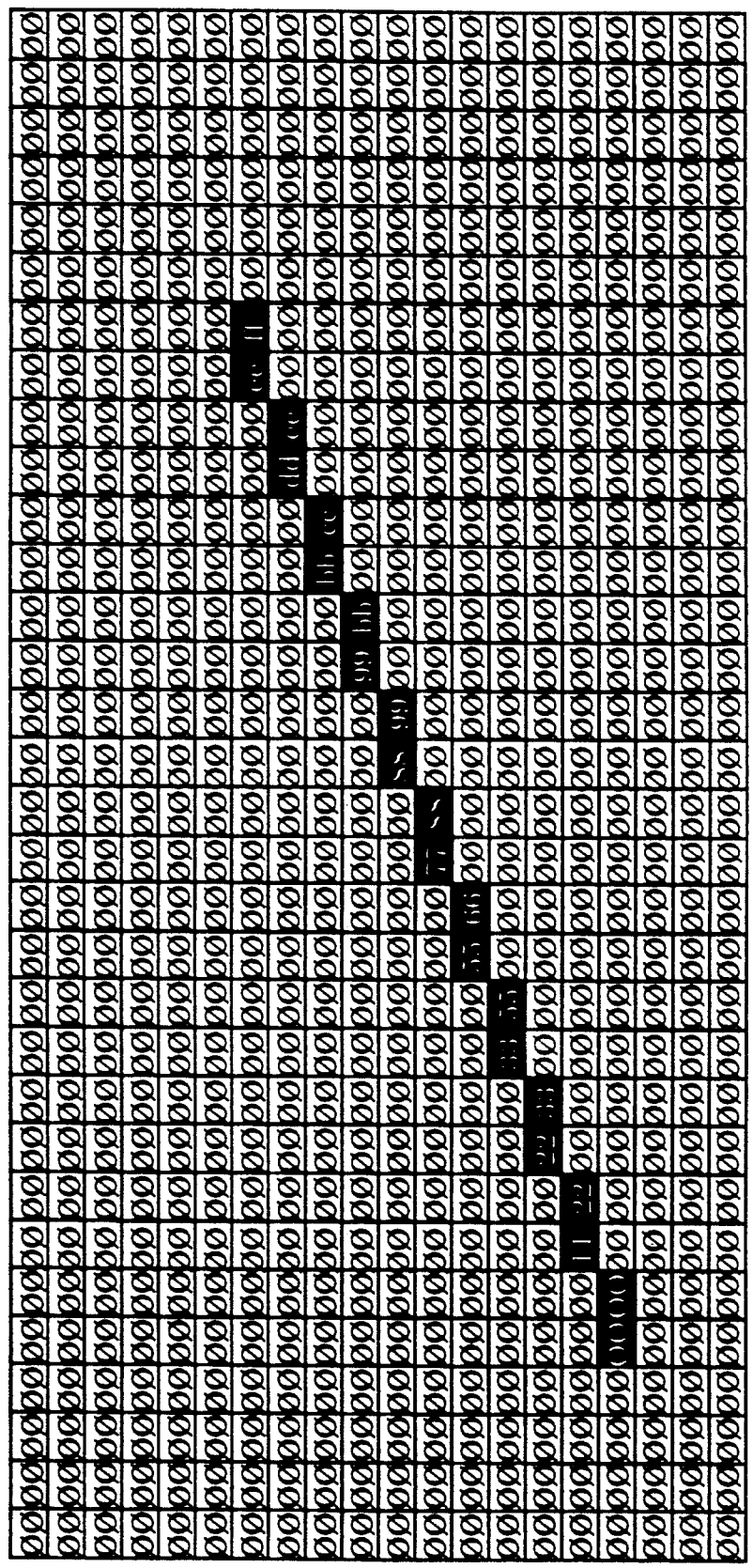

The resulting representation of the vector, set forth in FIG. 4d comprises only those quantized intensity levels arranged in such a manner that when viewed, the eye perceives not only the quantized values but the desired intermediate intensity values.

Figure 5A:
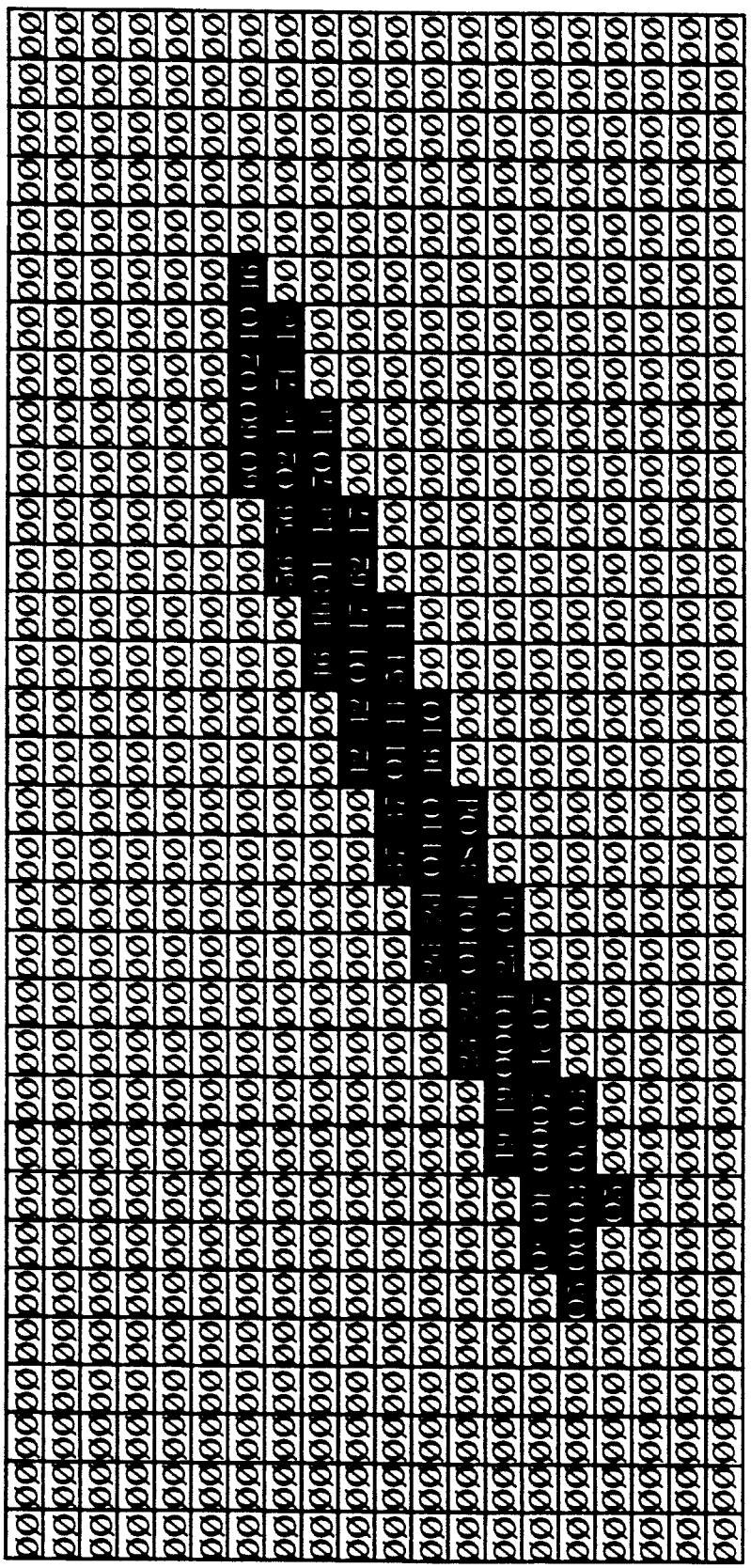
Figure 5D:
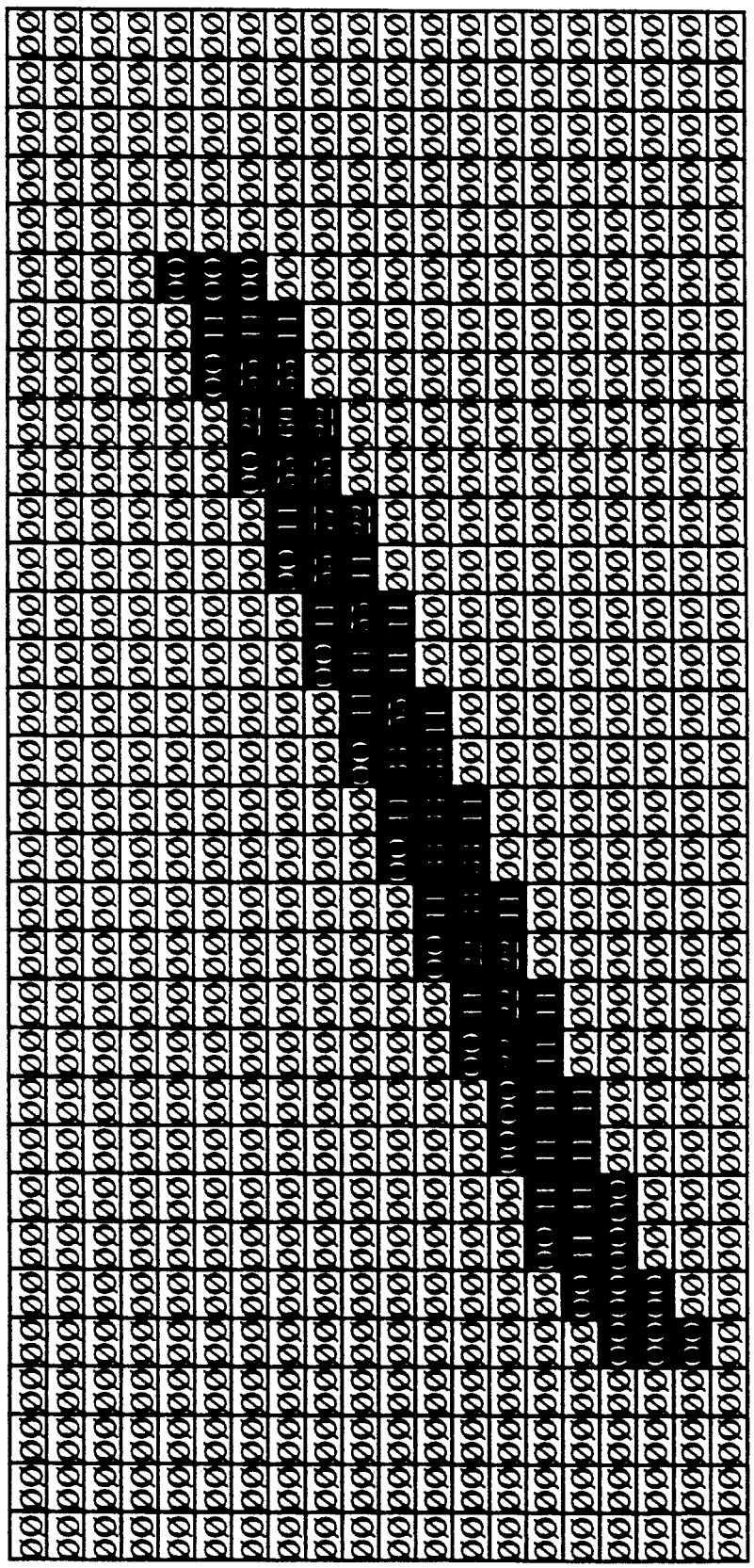

The system of the present invention also applies to vectors of varying widths as well as to anti-aliased vectors. For example, single pixel width vectors anti-aliased using the Gupta/Sproull method (See Gupta, Sproull, "Filtering Edges for Gray Scale Displays", *Computer Graphics*, Vol. 15, No. 3 (August 1981), result in 3 pixel wide vectors. Pixels on the edge of the anti-aliased vector are of intermediate intensities between the original color of the vector and the background, thereby blending the "jaggies" (the visible effect of an aliased vector) into the background. An anti-aliased vector using the Gupta/Sproull method is illustrated in FIG. 5a.

As with the earlier example, the elements of the dither matrix are organized to provide an accurate grouping of quantized intensity levels such that the eye will integrate the quantized levels and perceive the desired intermediate intensity levels. Although any shape dither matrix may be used, including the 1×16 matrix shown in FIG. 4b, it is preferred that a matrix whose width is equal to the line's width be used. Just as the size of a rectangular dither matrix is dependent upon how many intensity levels must be simulated between quantized output levels, so too does the size (and hence length) of the vector aligned dither matrix depend upon this parameter.

One dither matrix which may be used for an anti-aliased vector is illustrated in FIG. 6a. FIG. 6a illustrates a dither matrix in which three consecutive groups of dither values 0-15 are packed into a 3×16 matrix. This approach attempts to maintain the dispersed dot characteristic of a square dither matrix. FIG. 6b shows another 3×16 matrix which may be utilized in which each 1×16 row is treated independently in order to disperse the dots arising from dithering along the length of each row.

FIG. 6c shows another 3×16 dither matrix in which each 1×16 row is treated independently such that each row contains a single occurrence of the entries 0-15 but emphasis is placed on ensuring that each of the three entry columns sum up to approximately the same value. For example, the ideal value is 22.5, obtained by dividing the sum of all matrix entries, 360, by the number of matrix columns, 16.

FIG. 6d is still another 3×16 matrix which may be employed The matrix was generated in an attempt to "tighten up" the pattern addressing the theory that the unevenness of the edges is due to the low frequency periodicity of the 3×16 matrix. In each row, values appear in every second position, giving a period of two. However, there are only six unique entries and therefore fewer intermediate intensities which can be represented.

Each pixel is analyzed according to a process similar to that depicted in FIG. 3. However, at step 370, the three dither values in the column indexed are retrieved according to the index value. These three dither values are respectively compared to the three input intensity values in the column of the major axis coordinate currently being processed. Although three dither values are retrieved according to a single index value, each intensity value is separately analyzed to determine whether its output value is set to equal the corresponding computed base value or the computed base value plus one.

Figure 1A:
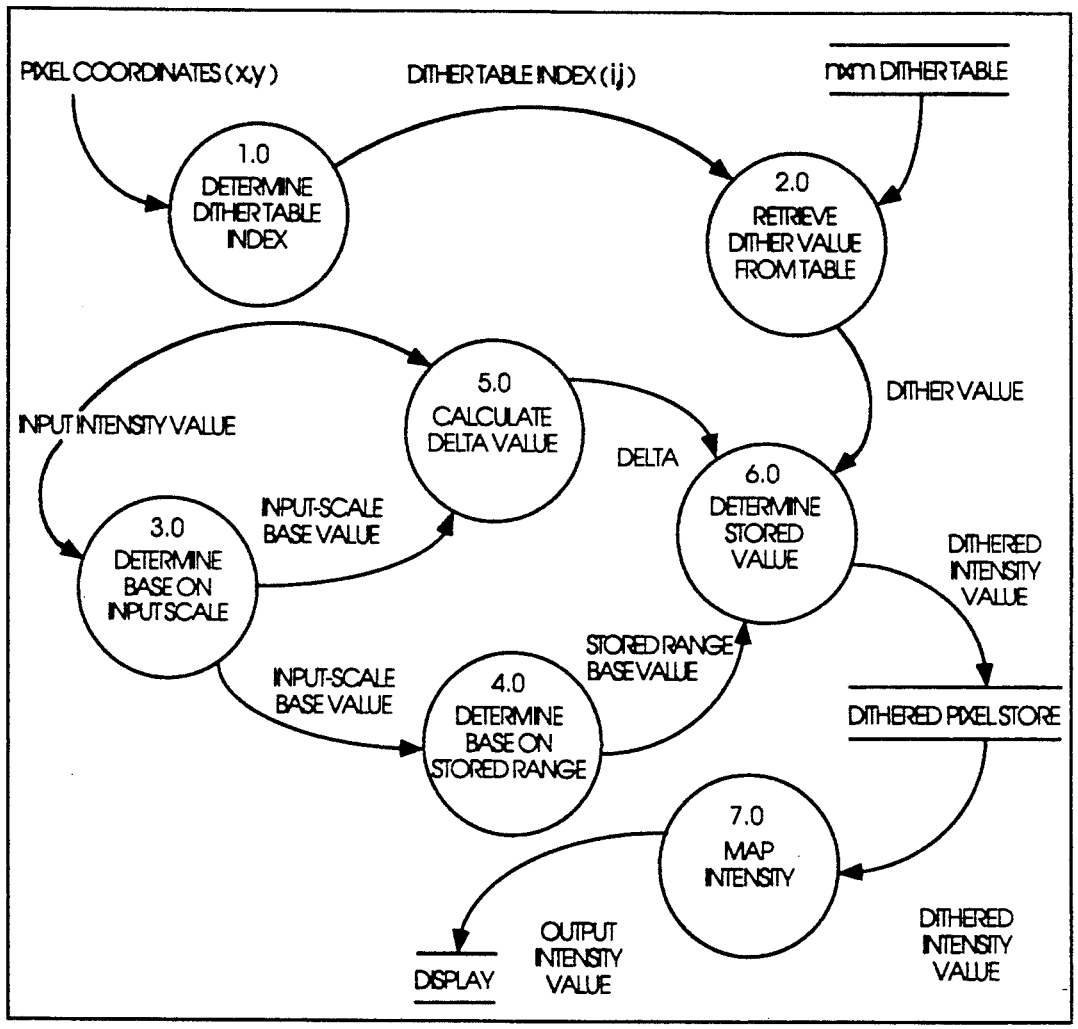
FIG. 1a is a flow diagram illustrative of the prior art ordered dithered process.
Figure 1B:
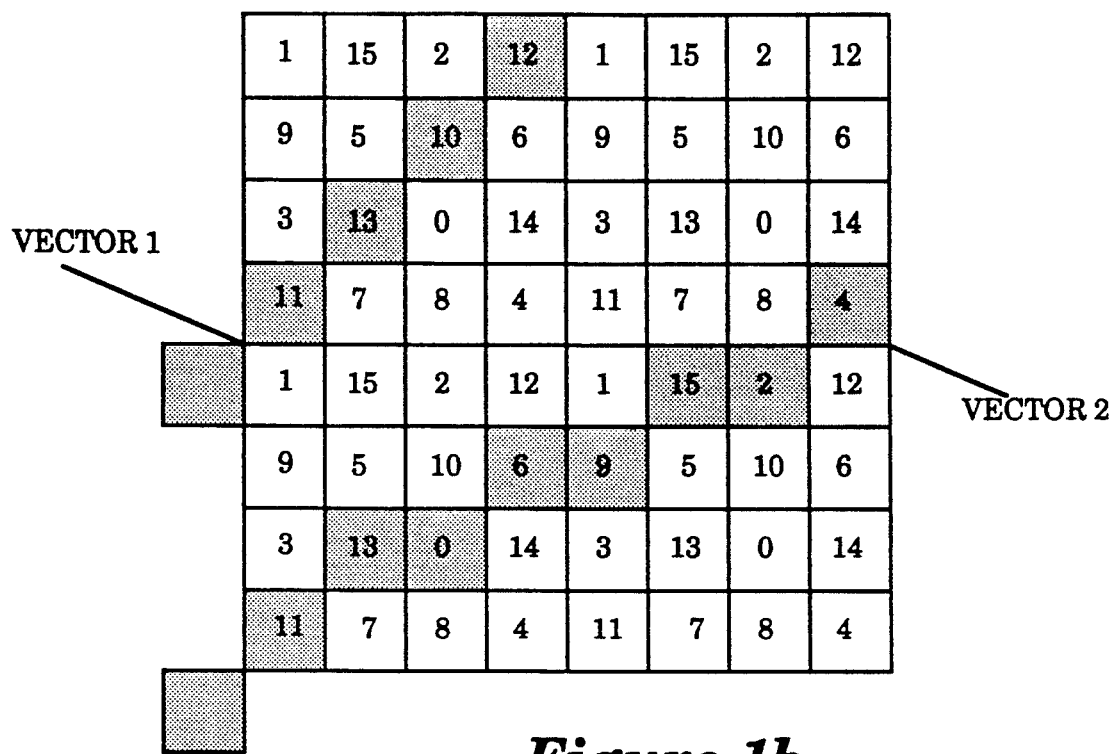
FIG. 1b illustrates the results of dithering vectors using the prior art process and FIG. 1c illustrates a more desirable result.
Figure 1C:
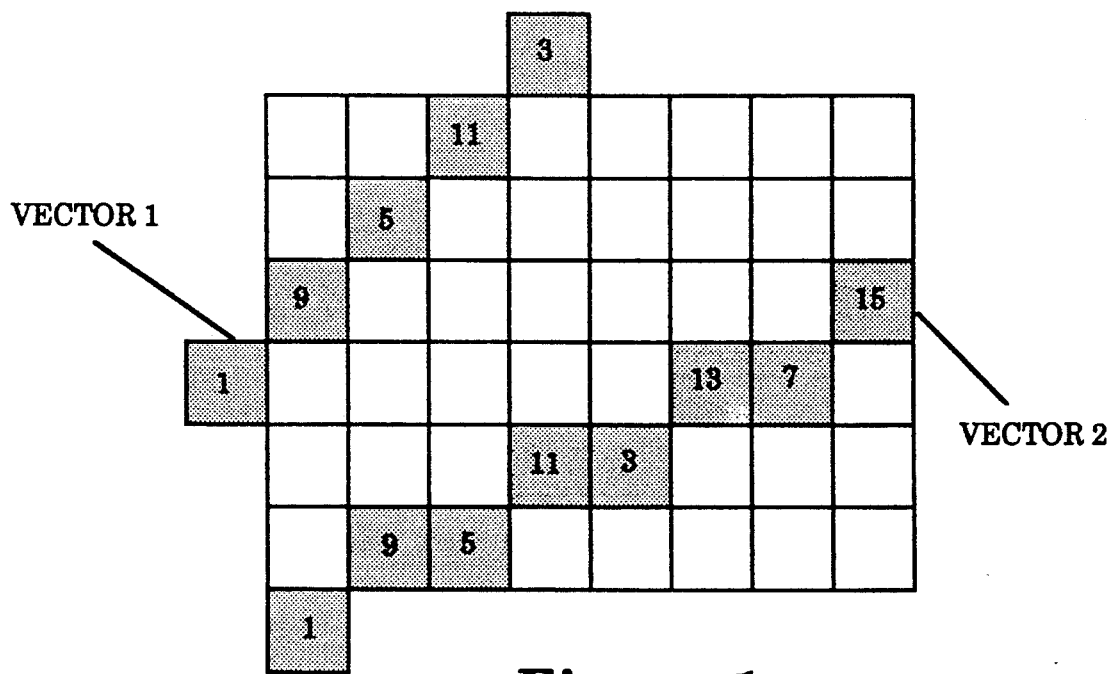

A numerical example is illustrated by FIGS. 5a, 5b, 5c1, 5c2 and 5d. FIG. 5a depicts the anti-aliased vector to be modified according to the process described above. The dither matrix employed in the process is illustrated in FIG. 5b. The intensity values shown comprise the 4 bit quantized intensity levels organized according to that process of the present invention such that the eye perceives the intermediate intensity levels eliminated during the quantization process. FIG. 5c1 and FIG. 5c2 are tables which show step by step the process employed to dither the input vector to the output vector illustrated in FIG. 5d.

While the invention has been described in conjunction with the preferred embodiment, it is evident that numerous alternatives, modifications, variations and uses will be apparent to those skilled in the art in light of the foregoing description. More particularly, the method and apparatus of the present invention may be used in conjunction with other computer graphics rendering techniques such as compositing. This is described in co-pending U.S. patent application Ser. No. 07/413,977 filed Sep. 28, 1989 entitled "Method and Apparatus for the Dithering of Antialiased Vectors". In addition this invention works equally well with monochrome as well as RGB images.

We claim:

1. In a computer system comprising a central processing unit, a graphics display comprising a matrix of pixels, and a frame buffer, a method for dithering a digital image and displaying said digital image on said graphics display, said digital image comprising pixels, each pixel having an electrical signal corresponding to an input intensity value associated with it representative of the intensity of the pixel wherein a digital image is dithered from a first representation of "p" bits per pixel intensity value to a second representation of "q" bits per pixel intensity value and p is greater than q, said method comprising the steps of:

determining quantized intensity levels the first representation is to be dithered to, the number of quantized intensity levels equal to 2q;

generating a plurality of electrical signals corresponding to a dither matrix of values, the elements in the dither matrix equal to the values between 0 and $(2^{(p-q)}-1)$ which are representative of the number of intermediate intensity values between quantized intensity levels, said elements organized to provide the desired visual perception of the intermediate intensity values;

aligning the dither matrix in accordance with an angle of the digital image, said dither matrix being indexed according to a major axis of the digital image;

selecting a starting index into the dither matrix;

retrieving an electrical signal corresponding to a dither value from the dither matrix for each pixel value, the dither value electrical signals being sequentially retrieved, starting at the starting index into the dither matrix;

generating an electrical signal corresponding to a quantized intensity value for a pixel value, said quantized intensity value being a value less than or equal to the pixel value;

generating an electrical signal corresponding to an input-scale base value which corresponds to the quantized intensity value;

for each pixel, comparing the electrical signal corresponding to the input intensity value, the electrical signal corresponding to the quantized intensity value, and the electrical signal corresponding to the retrieved dither value;

if the difference between the input intensity value and the quantized intensity value is less than or equal to the corresponding retrieved dither value, setting an output intensity level electrical signal for the pixel to be equal to the quantized intensity value;

if the difference between the input intensity value and the quantized intensity value is greater than the corresponding retrieved dither value, setting an output intensity level electrical signal for the pixel to be equal to a quantized intensity value which corresponds to the input-scale base value +1;

storing in the frame buffer the output intensity level electrical signal for each pixel at a location corresponding to the pixel;

retrieving the output intensity level electrical signals stored in the frame buffer; and generating an electrical signal to actuate the pixels on the graphics display such that each pixel is actuated at an intensity indicated by the stored output intensity level electrical signal for the pixel;

whereby the pixels comprising the digital image are dithered to provide actuated pixels at intensities which visually closely simulate the intermediate intensity values between quantized intensity levels of the digital image.

2. The method of claim 1 wherein the steps of aligning the dither matrix to the digital image and selecting the starting index into the dither matrix comprises the step of correlating a first pixel of the digital image along the major axis to a first element in the dither matrix.

3. The method of claim 1 wherein the steps of aligning the dither matrix to the digital image and selecting the starting index into the dither matrix comprises the step of selecting the starting index into the dither matrix to be a randomly generated offset value.

4. The method of claim 1 wherein the digital image comprises a plurality of vectors and the dither matrix is individually aligned to each vector.

5. The method of claim 4 wherein the steps of aligning the dither matrix to a vector and selecting the starting index into the dither matrix comprises the step of setting the starting index of the dither matrix to be equal to a last indexed matrix element used to render a previous dithered vector.

6. The method of claim 4 wherein;
p equals 8 and q equals 4; and
the dither matrix comprises 16 columns.

7. In a computer system comprising a central processing unit, a graphics display, and a frame buffer, a method for dithering a digital image and displaying said digital image on said graphic display, said digital image comprising vectors defined by pixels, each pixel having an electrical signal corresponding to an input intensity value associated with it representative of the intensity of the pixel wherein each vector is dithered from a first representation of "p" bits per pixel intensity value to a second representation of "q" bits per pixel intensity value and p is greater than q, said method comprising the steps of:

(a) determining quantized intensity levels the first representation is to be dithered to, the number of quantized intensity levels equal to 2q;

(b) generating a first plurality of electrical signals corresponding to a dither matrix, the elements in the dither matrix equal to the values between 0 and ($2^{(p-q)}-1$) which are representative of the number of intermediate intensity values between quantized intensity levels, said elements organized to provide the desired visual perception of the intermediate intensity values;

(c) aligning the dither matrix in accordance with an angle of the digital image, said dither matrix being indexed according to a major axis of the vector;

(d) selecting a starting index into the dither matrix;

(e) retrieving an electrical signal corresponding to a dither value from the dither matrix for each pixel value, the dither value electrical signals being sequentially retrieved, starting at the starting index into the dither matrix;

(f) generating an electrical signal corresponding to a quantized intensity value for a pixel value, said quantized intensity value being the value less than or equal to the pixel value;

(g) generating an electrical signal corresponding to an input-scale base value which corresponds to the quantized intensity value;

(h) for each pixel, comparing the electrical signal corresponding to the input intensity value, the electrical signal corresponding to the quantized intensity value, and the electrical signal corresponding to the retrieved dither value;

(i) if the difference between the input intensity value and the input-scale base value is less than or equal to the retrieved dither value, setting an output intensity level electrical signal for the pixel to be equal to the quantized intensity value;

(j) if the difference between the input intensity value and the input-scale base value is greater than the retrieved dither value, setting an output intensity level electrical signal for the pixel to be equal to a quantized intensity value which corresponds to the input-scale base value +1;

(k) storing in the frame buffer the output intensity level electrical signal for each pixel at a location corresponding to the pixel;

(l) retrieving the output intensity level electrical signals stored in the frame buffer; and (m) generating an electrical signal to actuate the pixels on the graphics display such that each pixel is actuated at an intensity indicated by the stored output intensity level electrical signal for the pixel;

whereby the pixels comprising the vector are dithered to provide actuated pixels at intensities which visually closely simulate the intermediate intensity values between quantized intensity levels of the digital image.

8. The method of claim 7 wherein the steps of aligning the dither matrix to the digital image and selecting the starting index into the dither matrix comprises the step of correlating a first pixel of the vector along the major axis to a first element in the dither matrix.

9. The method of claim 7 wherein the steps of aligning the dither matrix to the digital image and selecting the starting index into the dither matrix comprises the step of selecting the starting index into the dither matrix according to a randomly generated offset value.

10. The method of claim 7 wherein the steps of aligning the dither matrix to the digital image and selecting the starting index into the dither matrix comprises the step of setting the starting index of the dither matrix to be equal to a last indexed matrix element used to render a previous dithered vector.

11. The method of claim 7 wherein;
p equals 8 and q equals 4; and
the dither matrix comprises 16 columns.

12. The method of claim 7 wherein the vector to be dithered is 1 pixel in width and the dither matrix is of the dimensions 1×16.

13. The method of claim 7 wherein the vector to be dithered is an anti-aliased vector three pixels in width and the dither matrix is of the dimensions 3×16.

14. The method of claim 13 wherein;
the step of retrieving a dither value retrieves three dither values in the column indexed;
steps (f) through (i) are separately performed with respect to the three input intensity values in the column of the dither matrix and the corresponding dither values retrieved.

15. In a computer system comprising a central processing unit, a graphics display, and a frame buffer, a method for dithering a digital image and displaying said digital image on said graphics display, said digital image comprising pixels, each pixel having an electrical signal corresponding to an input intensity value associated with it representative of the intensity of the pixel wherein the digital image is dithered from a first representation of "p" bits per pixel intensity value to a second representation of "q" bits per pixel intensity value and p is greater than q, said method comprising the steps of:

determining quantized intensity levels the first representation is to be dithered to, the number of quantized intensity levels equal to 2q, wherein an interval spacing is the number of values between quantized intensity values;

generating a first plurality of electrical signals corresponding to establishing a dither matrix, the elements in the dither matrix equal to the values between 0 and the interval spacing which are representative of the number of integer values between quantized intensity values, said elements organized to provide the desired visual perception of the intermediate intensity values;

aligning the dither matrix in accordance with an angle of the digital image, said dither matrix being indexed according to a major axis of the digital image;

selecting a starting index into the dither matrix;

retrieving an electrical signal corresponding to a dither value from the dither matrix for each pixel value, the dither value electrical signals being sequentially retrieved, starting at the starting index into the dither matrix;

generating an electrical signal corresponding to a quantized intensity value for a pixel value, said quantized intensity value being the value less than or equal to the pixel value;

generating an electrical signal corresponding to an input-scale base value which corresponds to the quantized intensity value;

for each pixel, comparing the electrical signal corresponding to the input intensity value, the electrical signal corresponding to the quantized intensity value, and the electrical signal corresponding to the retrieved dither value;

if the difference between the input intensity value and the input-scale base value is less than or equal to the corresponding retrieved dither value, setting an output intensity level electrical signal for the pixel to be equal to the quantized intensity value;

if the difference between the input intensity value and the input-scale base value is greater than the corresponding retrieved dither value, setting an output intensity level electrical signal for the pixel to be equal to a quantized intensity value which corresponds to the input-scale base value $+1$;

storing in the frame buffer the output intensity level electrical signal for each pixel at a location corresponding to the pixel;

retrieving the output intensity level electrical signals stored in the frame buffer; and generating an electrical signal to actuate the pixels on the graphics display such that each pixel is actuated at an intensity indicated by the stored output intensity level electrical signal for the pixel;

whereby the pixels comprising the digital image are dithered to provide actuated pixels at intensities which visually closely simulate the intermediate intensity values between quantized intensity levels of the digital image.

16. The method of claim 15 wherein the steps of aligning the dither matrix to the digital image and selecting the starting index into the dither matrix comprises the step of correlating a first pixel of the digital image along the major axis to a first element in the dither matrix.

17. The method of claim 15 wherein the steps of aligning the dither matrix to the digital image and selecting the starting index into the dither matrix comprises the step of selecting the starting index into the dither matrix to be a randomly generated offset value.

18. The method of claim 15 wherein the digital image comprises a plurality of vectors and the dither matrix is individually aligned to each vector.

19. The method of claim 18 wherein the steps of aligning the dither matrix to a vector and selecting the starting index into the dither matrix comprises the step of setting the starting index of the dither matrix to be equal to a last indexed matrix element used to render a previous dithered vector.

20. The method of claim 15 wherein:
p equals 8 and q equals 4; and
the dither matrix comprises 16 columns.

21. An apparatus for dithering a digital image and displaying said digital image, said digital image comprising pixels, each pixel having an electrical signal corresponding to an input intensity value associated with it representative of the intensity of the pixel wherein the digital image is dithered from a first representation of "p" bits per pixel intensity value to a second representation of "q" bits per pixel intensity value and p is greater than q, said apparatus comprising:

a graphics display comprising a matrix of pixels;

a frame buffer;

means for determining a plurality of quantized intensity levels the first representation is to be dithered to, the number of quantized intensity levels equal to 2q;

means for generating a first plurality of electrical signals corresponding to a dither matrix, the elements in the dither matrix equal to the values between 0 and $(2^{(p-q)}-1)$ which are representative of the number of intermediate intensity values between quantized intensity levels, said elements organized to provide the desired visual perception of the intermediate intensity values;

means for aligning the dither matrix in accordance with an angle of the digital image, said dither matrix being indexed according to a major axis of the digital image;

means for selecting a starting index into the dither matrix;

means for retrieving an electrical signal corresponding to a dither value from the dither matrix for each pixel value, the dither value electrical signals being sequentially retrieved starting at the starting index into the dither matrix;

means for generating an electrical signal corresponding to a quantized intensity value for a pixel value, said quantized intensity value being the value less than or equal to the pixel value;

means for generating an electrical signal corresponding to an input-scale base value which corresponds to the quantized intensity value;

an output intensity level generator comprising:

means for comparing, for each pixel, the electrical signal corresponding to the input intensity value, the electrical signal corresponding to the quantized intensity value, and the electrical signal corresponding to the retrieved dither value;

if the difference between the input intensity value and the input-scale base value is less than or equal to the retrieved dither value, means for setting an output intensity level electrical signal for the pixel to be equal to the quantized intensity value;

if the difference between the input intensity value and the input-scale base value is greater than the retrieved dither value, means for setting an output intensity level electrical signal for the pixel to be equal to a quantized intensity value which corresponds to the input-scale base value $+1$;

output means for storing in the frame buffer the output intensity level electrical signal for each pixel at a location corresponding to the pixel;

frame buffer control means for retrieving the output intensity level electrical signals stored in the frame buffer; and means for generating an electrical signal to actuate the pixels on the graphics display such that each pixel is actuated at an intensity indicated by the stored output intensity level electrical signal for the pixel;

whereby the pixels comprising the digital image are dithered to provide actuated pixels at intensities which visually closely simulate the intermediate intensity values between quantized intensity levels of the digital image.

22. The apparatus of claim 21 wherein the means for aligning the dither matrix to the digital image and means for selecting the starting index into the dither matrix comprises a means for correlating a first pixel of the digital image along the major axis to a first element in the dither matrix.

23. The apparatus of claim 21 wherein the means for aligning the dither matrix to the digital image and means for selecting the starting index into the dither matrix comprises a means for selecting the starting index into the dither matrix according to a randomly generated offset value.

24. The apparatus of claim 21 wherein the digital image comprises a plurality of vectors and the dither matrix is individually aligned to each vector.

25. The apparatus of claim 24 wherein the means for aligning the dither matrix to a vector and selecting the starting index into the dither matrix comprises means for setting the starting index of the dither matrix to be equal to a last indexed matrix element used to render a previous dithered vector.

26. The apparatus of claim 21 wherein;
p equals 8 and q equals 4; and
the dither matrix comprises 16 columns.

27. An apparatus for dithering a digital image and displaying said digital image, said digital image comprising vectors defined by pixels, each pixel having an electrical signal corresponding to an input intensity value associated with it representative of the intensity of the pixel wherein each vector is dithered from a first representation of "p" bits per pixel intensity value to a second representation of "q" bits per pixel intensity value and m is greater than n, said apparatus comprising:

a graphics display comprising a matrix of pixels;
a frame buffer;

(a) means for determining quantized intensity levels the first representation is to be dithered to, the number of quantized intensity levels equal to 2q;

(b) means for generating a first plurality of electrical signals corresponding to a dither matrix, the elements in the dither matrix equal to the values between 0 and $(2^{(p-q)}-1)$ which are representative of the number of intermediate intensity values between quantized intensity levels, said elements organized to provide the desired visual perception of the intermediate intensity values;

(c) means for aligning the dither matrix in accordance with an angle of the digital image, said dither matrix being indexed according to a major axis of the vector;

(d) means for selecting a starting index into the dither matrix;

(e) means for retrieving an electrical signal corresponding to a dither value from the dither matrix for each pixel value, the dither value electrical signals being sequentially retrieved starting at the starting index into the dither matrix;

(f) means for generating an electrical signal corresponding to a quantized intensity value for the pixel value, said quantized intensity value being the value less than or equal to the pixel value;

(g) means for generating an electrical signal corresponding to an input-scale base value which corresponds to the quantized intensity value;

(h) means for comparing, for each pixel, the electrical signal corresponding to the input intensity value, the electrical signal corresponding to the quantized intensity value, and the electrical signal corresponding to the retrieved dither value;

(i) if the difference between the input intensity value and the input-scale base value is less than or equal to the retrieved dither value, means for setting an output intensity level electrical signal for the pixel to be equal to the quantized intensity value;

(j) if the difference between the input intensity value and the input-scale base value is greater than the retrieved dither value, means for setting an output intensity level electrical signal for the pixel to be equal to a quantized intensity value which corresponds to the input-scale base value $+1$;

output means for storing in the frame buffer the output intensity level electrical signal for each pixel at a location corresponding to the pixel;

frame buffer control means for retrieving the output intensity level electrical signals stored in the frame buffer and means for generating an electrical signal to actuate the pixels on the graphics display such that each pixel is actuated at an intensity indicated by the stored output intensity level electrical signal for the pixel;

whereby the pixels comprising the vector are dithered to provide actuated pixels at intensities which visually closely simulate the intermediate intensity values between quantized intensity levels of the digital image.

28. The apparatus of claim 27 wherein the means for aligning the dither matrix to the digital image and means for selecting the starting index into the dither matrix comprises means for correlating a first pixel of the vector along the major axis to a first element in the dither matrix.

29. The apparatus of claim 27 wherein the means for aligning the dither matrix to the digital image and means for selecting the starting index into the dither matrix comprises means for selecting the starting index into the dither matrix according to a randomly generated offset value.

30. The apparatus of claim 27 wherein the means for aligning the dither matrix to the digital image and selecting the starting index into the dither matrix comprises means for setting the starting index of the dither matrix to be equal to a last indexed matrix element used to render a previous dithered vector.

31. The apparatus of claim 27 wherein;
p equals 8 and q equals 4; and
the dither matrix comprises 16 columns.

32. The apparatus of claim 27 wherein the vector to be dithered is 1 pixel in width and the dither matrix is of the dimensions 1×16.

33. The apparatus of claim 32 wherein the vector to be dithered is an anti-aliased vector three pixels in width and the dither matrix is of the dimensions 3×16.

34. The apparatus of claim 33 wherein;
the means for retrieving a dither value retrieves three dither values in the column indexed;
the means represented by elements (f) through (i) separately perform with respect to the three input intensity values in the column of the dither matrix and the corresponding dither values retrieved.

35. An apparatus for dithering a digital image and displaying said digital image, said digital image comprising pixels, each pixel having an electrical signal corresponding to an input intensity value associated with it representative of the intensity of the pixel wherein a digital image is dithered from a first representation of "p" bits per pixel intensity value to a second representation of "q" bits per pixel intensity value and p is greater than q, said apparatus comprising:
a graphics display comprising a matrix of pixels;
a frame buffer;
means for determining quantized intensity levels the first representation is to be dithered to, the number of quantized intensity levels equal to 2q, wherein an interval spacing is the number of values between quantized intensity values;
means for generating a first plurality of electrical signals corresponding to a a dither matrix, the elements in the dither matrix equal to the values between 0 and the interval spacing which are representative of the number of integer values between quantized intensity values, said elements organized to provide the desired visual perception of the intermediate intensity values;
means for aligning the dither matrix in accordance with an angle of the digital image, said dither matrix being indexed according to a major axis of the digital image;
means for selecting a starting index into the dither matrix;
means for retrieving an electrical signal corresponding to a dither value from the dither matrix for each pixel value, the dither value electrical signals being sequentially retrieved starting at the starting index into the dither matrix;
means for generating an electrical signal corresponding to a quantized intensity value for a pixel value, said quantized intensity value being the value less than or equal to the pixel value;
means for generating an electrical signal corresponding to an input-scale base value which corresponds to the quantized intensity value;
means for comparing, for each pixel, the electrical signal corresponding to the input intensity value, the electrical signal corresponding to the quantized intensity value, and the electrical signal corresponding to the retrieved dither value;
if the difference between the input intensity value and the input-scale base value is less than or equal to the retrieved dither value, means for setting an output intensity level electrical signal for the pixel to be equal to the quantized intensity value;
if the difference between the input intensity value and the input-scale base value is greater than the retrieved dither value, means for setting an output intensity level electrical signal for the pixel to be equal to a quantized intensity value which corresponds to the input-scale base value +1;
output means for storing in the frame buffer the output intensity level electrical signal for each pixel at a location corresponding to the pixel;
frame buffer control means for retrieving the output intensity level electrical signals stored in the frame buffer; and
means for generating an electrical signal to actuate the pixels on the graphics display such that each pixel is actuated at an intensity indicated by the stored output intensity level for the pixel;
whereby the pixels comprising the digital image are dithered to provide actuated pixels at intensities which visually closely simulate the intermediate intensity values between quantized intensity levels of the digital image.

36. The apparatus of claim 35 wherein the means for aligning the dither matrix to the digital image and means for selecting the starting index into the dither matrix comprises a means for correlating a first pixel of the digital image along the major axis to a first element in the dither matrix.

37. The apparatus of claim 35 wherein the means for aligning the dither matrix to the digital image and means for selecting the starting index into the dither matrix comprises a means for selecting the starting index into the dither matrix according to a randomly generated offset value.

38. The apparatus of claim 35 wherein the digital image comprises a plurality of vectors and the dither matrix is individually aligned to each vector.

39. The apparatus of claim 38 wherein the means for aligning the dither matrix to a vector and selecting the starting index into the dither matrix comprises means for setting the starting index of the dither matrix to be equal to a last indexed matrix element used to render a previous dithered vector.

40. The apparatus of claim 35 wherein;
p equals 8 and q equals 4; and
the dither matrix comprises 16 columns.

41. A method for dithering and displaying an image on a two-dimensional (X dimension and Y dimension) graphics display, said image comprising a plurality of pixels forming at least one vector, from a first representation of "p" bits per pixel intensity value to a second representation of "q" bits per pixel intensity value where p is greater than q, said method comprising the steps of:
generating a first plurality of electrical signals wherein each one of said first plurality of electrical signals corresponds to a distinct one of said plurality of pixels and further indicates an input intensity for that particular pixel;

generating a second plurality of electrical signals wherein each one of said second plurality of electrical signals corresponds to a distinct one of said plurality of pixels and further indicates an input-scale base intensity value for that particular pixel;

generating a third plurality of electrical signals wherein each one of said third plurality of electrical signals corresponds to a dither matrix value in a dither matrix;

comparing said first plurality of electrical signals to said second plurality of electrical signals to generate a fourth plurality of electrical signals, said fourth plurality of electrical signals indicating the intensity differences between said first plurality of electrical signals and said second plurality of electrical signals;

determining in which dimension on said two-dimensional graphics display said at least one vector is longer;

in the event that said at least one vector is longer in the X dimension;

comparing said third plurality of electrical signals to said fourth plurality of electrical signals in accordance with a first ordering of comparisons based upon a first aligning of the dither matrix in accordance with an angle of said at least one vector wherein the dither matrix is indexed according to a major axis of said at least one vector, and utilizing the results of said comparisons to generate a fifth plurality of electrical signals, wherein each one of said fifth plurality of electrical signals corresponds to a distinct one of said plurality of pixels and further indicates a dithered output intensity for that particular pixel;

applying said fifth plurality of electrical signals to said two-dimensional graphics display;

actuating said plurality of pixels on said two-dimensional graphics display in accordance with the dithered output intensities indicated by said fifth plurality of electrical signals;

in the event that said at least one vector is longer in the Y dimension;

comparing said third plurality of signals to said fourth plurality of electrical signals in accordance with a second ordering comparisons based upon a second aligning of the dither matrix in accordance with an angle of said at least one vector wherein the dither matrix is indexed according to a major axis of said at least one vector, further wherein said second ordering of comparisons is different from said first ordering, and utilizing the results of said comparisons to generate a sixth plurality of electrical signals, wherein each one of said sixth plurality of electrical signals corresponds to a distinct one of said plurality of pixels and further indicates a dithered output intensity for that particular pixel;

applying said sixth plurality of electrical signals to said two-dimensional graphics display;

actuating said plurality of pixels on said two-dimensional graphics display in accordance with the dithered output intensities indicated by said sixth plurality of electrical signals.

42. A system for dithering an image comprising a plurality of contiguous pixels forming at least one vector, from a first representation of "p" bits per pixel intensity value to a second representation of "q" bits per pixel intensity value where p is greater than q, said system comprising:

an input device for inputting vector image information to said system;

an input/output circuit coupled to said input device for formatting said vector image information;

a display monitor for displaying said vector image on a two-dimensional display screen, said display screen comprising a plurality of pixels, wherein each one of said pixels is capable of being in any one of a plurality of states of display intensity, said display monitor coupled to said input/output circuit;

a memory circuit coupled to said input/output circuit;

means for generating a first plurality of electrical signals coupled to said input/output circuit, wherein each one of said first plurality of electrical signals corresponds to a distinct one of said plurality of contiguous pixels and further indicates an input intensity for that particular pixel;

means for generating a second plurality of electrical signals coupled to said input/output circuit, wherein each one of said second plurality of electrical signals corresponds to a distinct one of said plurality of contiguous pixels and further indicates an input-scale base intensity value for that particular pixel;

means for generating a third plurality of electrical signals coupled to said input/output circuit wherein each one of said third plurality of electrical signals corresponds to a dither matrix value in a dither matrix;

means for comparing said first plurality of electrical signals to said second plurality of electrical signals and generating a fourth plurality of electrical signals, said fourth plurality of electrical signals indicating the intensity differences between said first plurality of electrical signals and said second plurality of electrical signals;

means for determining in which dimension on said two-dimensional display screen said at least one vector is longer;

means for selectively comparing said third plurality of electrical signals to said fourth plurality of electrical signals in a particular order, wherein said particular order takes place in a first order based upon a first aligning of the dither matrix in accordance with an angle of said at least one vector wherein the dither matrix is indexed according to a major axis of said at least one vector, if said at least one vector is longer in the X dimension, and further wherein said particular order takes place in a second order based upon a second aligning of the dither matrix in accordance with an angle of said at least one vector wherein the dither matrix is indexed according to a major axis of said at least one vector, if said at least one vector is longer in the Y dimension, wherein said first order is different from said second order;

means for utilizing the comparisons of the third plurality of electrical signals to the fourth plurality of electrical signals to generate a fifth plurality of electrical signals coupled to said display monitor, wherein each one of said fifth plurality of electrical signals corresponds to a distinct one of said plurality of pixels and further indicates a dithered output intensity for that particular pixel.

* * * * *